United States Patent [19]
Fujikawa et al.

[11] Patent Number: 4,701,827
[45] Date of Patent: Oct. 20, 1987

[54] MULTILAYER CERAMIC CAPACITOR

[75] Inventors: Nobuyoshi Fujikawa, Kokubu; Syuichi Kawaminami, Hayato; Nobuo Yokoe, Kokubu, all of Japan

[73] Assignee: Kyocera Corporation, Kyoto, Japan

[21] Appl. No.: 827,444

[22] Filed: Feb. 10, 1986

[51] Int. Cl.[4] .................. H01G 1/00; H01G 4/12
[52] U.S. Cl. ............................... 361/309; 361/321
[58] Field of Search ............ 361/320, 321, 308, 309, 361/310

[56] References Cited
U.S. PATENT DOCUMENTS

| 4,097,911 | 6/1978 | Dorrian | 361/321 X |
| 4,223,369 | 9/1980 | Burn | 361/321 |
| 4,451,869 | 5/1984 | Sakabe et al. | 361/321 X |

FOREIGN PATENT DOCUMENTS

| 11389 | 5/1980 | European Pat. Off. | 361/309 |
| 48009 | 9/1980 | Japan | 361/321 |

Primary Examiner—Donald A. Griffin
Attorney, Agent, or Firm—Spensley Horn Jubas & Lubitz

[57] ABSTRACT

Disclosed is a multilayer ceramic capacitor comprising internal electrodes composed of nickel and terminations composed of a composition comprising at least one member selected from nickel, cobalt and copper and a zinc borosilicate glass. A zinc borosilicate glass comprising 40 to 65 mole % of ZnO, 20 to 40 mole % of $B_2O_3$ and 10 to 35 mole % of $SiO_2$ is especially suitable as the glass component. The terminations are excellent in adhesion to the internal electrodes and adhesion to a dielectric body.

4 Claims, 2 Drawing Figures

MULTILAYER CERAMIC CAPACITOR

BACKGROUND OF THE INVENTION (1) Field of the Invention

The present invention relates to a multilayer ceramic capacitor. More particularly, the present invention relates to a multilayer ceramic capacitor comprising internal electrodes composed of nickel and termination electrodes which are excellent in adhesion to the internal electrodes and also in adhesion to a dielectric body.

(2) Description of the Prior Art

Commercially available multilayer ceramic capacitors are fabricated by laminating a plurality of thin dielectric bodies having an internal electrode formed on the surface thereof, integrally sintering the laminate, and connecting the internal electrodes in parallel alternately to a pair of termination electrodes (electrodes for external connection) formed on the side faces of the sintered body.

When a noble metal such as palladium (Pd) or silver-palladium (Ag-Pd) is used for the internal electrode, the total cost of the capacitor is increased. Accordingly, a trial has recently been made to use nickel (Ni), which is a relatively cheap base metal, as the material of the internal electrode. Accordingly, investigations have been made to find a metal for the termination electrodes, having a good compatibility with nickel (Ni) used for the internal electrode.

In multilayer ceramic capacitors, silver (Ag) and silver-palladium (Ag-Pd) is ordinarily used as the termination electrodes metal. However, when a noble metal such as silver (Ag) or silver-palladium (Ag-Pd) is used for the termination electrodes, the total cost of the capacitor is increased, and since silver (Ag) or silver-palladium (Ag-Pd) is poor in compatibility with nickel (Ni) as the internal electrode, the connection between the internal and termination electrodes is insufficient and there are brought about fatal defects of electric characteristics, such as reduction of the electric capacity of the capacitor and increase of the dielectric loss (tan $\delta$). As means for obviating this disadvantage, there may be considered a method in which a metal having a good compatibility with nickel (Ni) of the internal electrode and providing a good bonding between electrodes, that is, the same metal (Ni) as the metal of the internal electrode or a metal capable of being easily alloyed with the internal electrode, such as copper, iron or cobalt, is used as the termination electrodes. However, in this case, there arises a problem concerning the glass component to be mixed with this metal.

For example, it is known that lead borosilicate or bismuth borosilicate is mixed as the glass component with silver (Ag) or silver-palladium (Ag-Pd) and the mixture is coated on a dielectric body and sintered in air. However, if lead borosilicate glass or bismuth borosilicate glass is mixed with nickel (Ni) or a metal capable of being easily alloyed with nickel (Ni) and the mixture is sintered, nickel (Ni) or the metal capable of being easily alloyed with nickel (Ni) is oxidized, though this oxidation is not caused in case of silver (Ag) or silver-palladium (Ag-Pd), and this oxidation results in reduction of the capacity of the capacitor and increase of the dielectric loss. As means for obviating this disadvantage, there may be considered a method in which a mixture of nickel (Ni) or the metal capable of being easily alloyed with nickel (Ni) and lead borosilicate glass or bismuth borosilicate glass is sintered in a non-oxidizing atmosphere. As indicated by curves $l_1$ and $l_2$ in FIG. 2, lead oxide (PbO) and bismuth oxide ($Bi_2O_3$) are poorer in the thermal stability than $Al_2O_3$ and $SiO_2$ indicated by curves $l_3$ and $l_4$ in FIG. 2. Accordingly, for example, at a temperature of 900° C., if the oxygen partial pressure ($PO_2$) in the sintering atmosphere is reduced below about $10^{-10}$ atmosphere, lead oxide and bismuth oxide releas oxygen, that is, they are reduced. Accordingly, in the non-oxidizing atmosphere, lead oxide (PbO) or bismuth oxide ($Bi_2O_3$) in the glass component is reduced and the glass becomes brittle, with the result that the strength of the termination electrodes per se is reduced, the strength of fixing to the dielectric body is reduced, the adhesion between the electrodes becomes insufficient and reduction of the capacity and increase of dielectric loss are caused.

SUMMARY OF THE INVENTION

We found that if a composition comprising at least one member selected from nickel, cobalt and copper and a zinc borosilicate glass is used as the termination electrodes of a multilayer ceramic capacitor having internal electrodes composed of nickel, the adhesion of the external electrode to the internal electrode and the adhesive strength to a dielectric body are prominently improved.

We also found that if a zinc borosilicate glass, especially one having a composition described in detail hereinafter, is used for the termination electrodes-forming composition, impartment of an electric conductivity by sintering of the above-mentioned metal component and fixation of the termination electrodes to the dielectric body by fusion of the glass component can be effectively accomplished without degradation of the strength of the termination or deterioration of the termination electrodes.

It is therefore a primary object of the present invention to provide a multilayer ceramic capacitor having internal electrodes composed of nickel (Ni), which comprises termination electrodes having a good adhesion to nickel (Ni) of the internal electrodes and being excellent in the adhesive strength to a dielectric body.

Another object of the present invention is to provide a multilayer ceramic capacitor in which in sintering a composition for formation of termination electrodes in a non-oxidizing atmosphere, impartment of an electric conductivity by sintering of a metal component and fixing to a dielectric body by fusion of a glass component can be easily accomplished without degradation of the strength of termination electrodes or deterioration of the termination electrodes.

More specifically, in accordance with the present invention, there is provided a multilayer ceramic capacitor comprising a laminate of units, each comprising a ceramic dielectric layer and an internal electrode, and termination electrodes arranged around said laminate and electrically connected to the internal electrodes, wherein the internal electrodes are composed of nickel and the termination electrodes are composed of a composition comprising at least one member selected from nickel, cobalt and copper and a zinc borosilicate glass.

Furthermore, according to the present invention, there is provided a multilayer ceramic capacitor as set forth above, wherein the zinc borosilicate glass of the composition for formation of the termination electrodes comprises at least 40 to 50 mole%, based on the oxides, of zinc oxide, 20 to 40 mole%, based on the oxides, of boric anhydride and 10 to 35 mole%, based on the oxides, of silica.

DETAILED DESCRIPTION OF THE PREFERRED EMBODIMENTS

Figure 1:
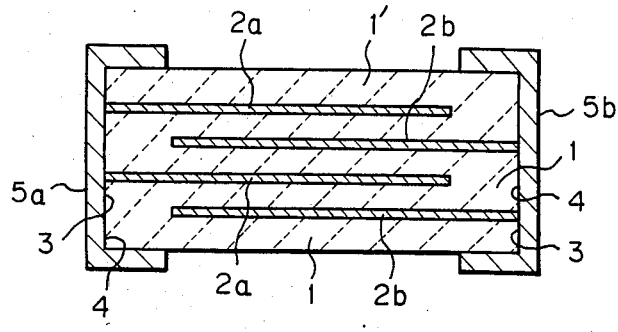
FIG. 1 is a diagram illustrating the sectional structure of an embodiment of the multilayer ceramic capacitor according to the present invention.
Figure 2:
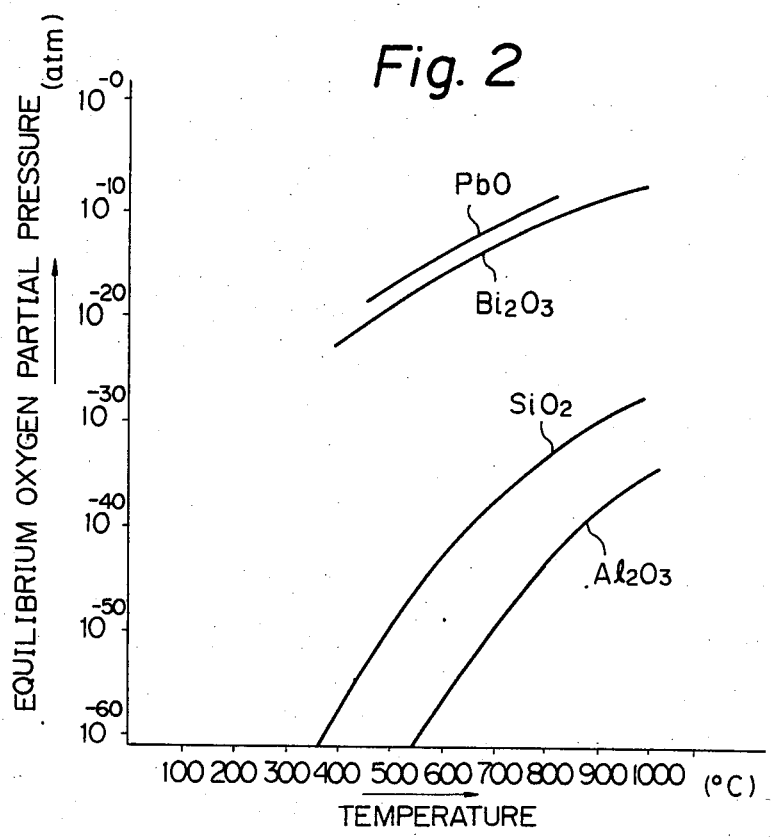
FIG. 2 is a graph illustrating the relations between the temperature and the equilibrium oxygen partial pressure in oxides of conventional glass components.

Referring to FIG. 1, in the multilayer ceramic capacitor of the present invention, a plurality of plate units, each of which comprises an internal electrode 2a (or 2b) extending to one end 3 but not extending to the other end 4 and being arranged on the surface of a thin layer 1 of a dielectric ceramic body composed of barium titanate or the like, are piled together so that the internal electrode-extending ends 3 and the internal electrode-non-extending ends 4 are alternately arranged and only the dielectric layer 1' is located as the topmost unit, and these piled units are compressed and sintered to form an integrated laminate. A pair of terminal 5a and 5b composed of a composition described in detail hereinafter are fixed and integrated to both the sides of the integrated laminate. One electrode 2a of a pair of alternately arranged adjacent internal electrodes is connected to the termination electrode 5a and the other internal electrode 2b is connected to the termination electrode 5b.

According to the present invention, the termination electrodes 5a and 5b are formed from a composition comprising (a) at least one metal selected from nickel, cobalt and copper and (b) a zinc borosilicate glass.

The component (a) is indispensable for bonding the termination electrode to the internal electrode. Since nickel (Ni) is the same metal as that of the internal electrode, good electric bonding can be maintained by sintering of the metal. Since cobalt (Co) belongs to the same group as that of nickel (Ni) of the internal electrode, cobalt readily forms an alloy with Ni at the sintering step and good electric connection can be maintained. Moreover, since copper (Cu) readily forms an alloy with Ni of the internal electrode, an alloy of Cu with Ni is readily formed at the sintering step and good electric connection can be maintained.

The glass component (b) is indispensable for bonding the termination electrode to the dielectric ceramic body at the sintering step.

In the composition for the termination electrode, which is used in the present invention, it is preferred that the weight ratio of Cu to Ni and/or Co be in the range of from 95/5 to 5/95, especially from 90/10 to 10/90. Furthermore, in order to impart a good electric conductivity and ensure a strong sticking of the termination electrode to the dielectric body, it is preferred that the volume ratio of the metal component to the glass component be in the range of from 70.0/30.0 to 95.0/5.0, especially from 75.0/25.0 to 85.0/15.0.

In the composition for the termination electrode, which is used in the present invention, in order to increase the density of the termination electrode and the adhesive strength to the dielectric body, it is preferred that the average particle size of the metal component (a) be 0.5 to 1.4 μm.

A zinc borosilicate glass is used as the glass component (b) in the present invention. It was found that when the zinc borosilicate glass is used as the glass component of the composition for the termination electrode and the composition is coated on the dielectric body and sintered in a non-oxidizing atmosphere, the above-mentioned tendency of reduction is eliminated, and good adhesion is maintained between the termination electrode and internal electrode and the adhesive strength of the termination electrode to the dielectric body is improved. It is preferred that the zinc borosilicate glass be one comprising 40 to 65 mole% of zinc oxide (ZnO), 20 to 40 mole% of boric anhydride ($B_2O_3$) and 10 to 35 mole% of silica ($SiO_2$). The sintering temperature of the above-mentioned metal component is about 900° to about 1000° C. A glass comprising ZnO, $B_2O_3$ and $SiO_2$ at the above-mentioned ratio sufficiently flows at the above-mentioned sintering temperature and is not oxidized at the sintering step, and an excellent glassy texture can be maintained. In this glass $B_2O_3$ and $SiO_2$ are glass network formers, and ZnO is a glass network modifier. Accordingly, if the content of zinc oxide (AnO) is lower than 40 mole% or exceeds 65 mole%, the softening point of the glass becomes too high, and a sufficient adhesive strength can not be obtained at the sintering step or vitrification becomes difficult. If the content of boric anhydride ($B_2O_3$) is lower than 20 mole%, the softening point of the glass is elevated or if the content of boric anhydride is higher than 40 mole%, a stable glass cannot be obtained. If the content of silica ($SiO_2$) is lower 10 mole%, a stable glass cannot be obtained and if the silica content exceeds 35 mole%, the softening point of the glass is elevated.

Of course, the glass composition used in the present invention may comprise other components in addition to the above-mentioned three components. For example, small amounts of an alkali metal oxide such as $Li_2O$, $Na_2O$ or $K_2O$ and an alkaline earth metal oxide, such as CaO, SrO or BaO and alumina ($Al_2O_3$).

The foregoing ingredients are sufficiently mixed and heat-melted, the melt is cooled and solidified, and the solidified product is pulverized to obtain a glass component to be compounded.

In forming the termination electrode, the above-mentioned metal powder and glass powder are mixed together, and an organic vehicle is added to the mixture to form a coating composition having a viscosity suitable for the coating operation. This coating composition is coated on the end portion of the laminated sintered structure of internal electrodes and dielectric layers, and the composition is dried and sintered at the sintering temperature of the metal in a non-oxidizing atmosphere, especially a nitrogen atmosphere, to form an termination electrode.

The present invention will now be described in detail with reference to the following examples that by no means limit the scope of the invention.

EXAMPLE 1

Small amounts of aluminum hydroxide (Al(OH)$_3$), sodium carbonate ($Na_2CO_3$) and lithium carbonate ($Li_2CO_3$) were added to zinc oxide (ZnO), boric acid ($H_3BO_3$) and silicic anhydride ($SiO_2$) to form a glass composition shown in Table 1 (glasses A through O). Furthermore, bismuth oxide ($Bi_2O_3$) or lead oxide (PbO) was added to the above composition to form a glass composition (glasses P and Q). In each composition, the respective ingredients were weighed and mixed so that the total amount was 100 g. Each composition was dry-blended in an automatic mortar and charged in a platinum crucible, and the composition was melted at 1200° to 1300° C., and the melt was cast on a stainless steel plate and rapidly cooled in air to obtain a glass block. The obtained glass block was dry-pulverized and passed through a 250-mesh sieve to obtain a glass powder.

Separately, powdery nickel having a chemical purity of 99.5% and an average particle size of 1.0 μm was mixed with an organic vehicle and one of the glass compositions A through Q shown in Table 1 so that the nickel/vehicle/glass weight ratio was 69/25/6, and similarly, powdery copper having a chemical purity of 99.5% and an average particle size of 1.0 μm was mixed with an organic vehicle and one of the compositions A through Q shown in Table 1 so that the copper/vehicle/glass weight ratio was 69/25/6. Each composition was blended by a three-roll mill, and some organic solvent was added to the formed paste so as to adjust the viscosity of the paste. The mixing ratio of nickel (Ni) or copper (Cu) in the paste that the amount of nickel (Ni) or copper (Cu) was about 80% by volume per about 20% by volume of the glass. The paste was coated on the end portion of a multilayer ceramic capacitor comprising internal electrodes of nickel, and the paste was dried and sintered at 900° C. for 30 minutes in a nitrogen atmosphere to fire and fix the termination electrodes to the capacitor. Thus, samples 1 through 34 shown in Tables 2 and 3 were obtained. The used laminated ceramic capacitor was formed from a barium titanate type dielectric material and nickel as the internal electrode material. The size of the capacitor was about 3.18 mm×about 1.57 mm×about 0.56 mm. The width of the paste coated on the end portion of the capacitor was about 0.5 mm, and the amount coated was about 1.5 mg on both the sides. With respect to each of the so-obtained samples the electric capacity and dielectric loss (tan δ) were measured at 25° C. at a frequency of 1 KHz and an input voltage of 1 Vrms. Furthermore, the insulation resistance (IR) was measured after a direct current voltage of 50 V was applied for 1 minute, and the withstand voltage was tested by applying a direct current voltage of 125 V for 3 seconds. Moreover, the temperature characteristic of the electric capacity was determined within a temperature range of from −30° C. to +85° C. at a frequency of 1 KHz and an input voltage of 1 Vrms. Still further, in order to evaluate the wettability of a solder with the termination electrode, the sample was immersed in a molten solder at 230° C. for 3 seconds. The case where at least 75% of the surface of the termination electrode was covered with the solder is indicated by mark "O", and the case where less than 75% of the surface of the external electrode was covered with the solder is indicated by mark "X". Still further, in order to test the solder leach resistance of the termination, the sample was immersed in the molten solder at 270° C. for a certain time. The case where there was no defect on the appearance or in connection with the electric characteristics is indicated by mark "O", and the case where a defect appeared was indicated by mark "X". Still further, the adhesive strength of the termination electrode was tested (the sample was soldered to a copper-lined glass/epoxy substrate, the sample was pushed from the back side of the substrate through the hole that arranged under the sample and the strength of the force causing destruction of the sample was measured). The case where the destruction value was at least 1.0 Kg is indicated by mark "O" and the case where the destruction strength was lower than 1.0 Kg is indicated by mark "X", and the parenthesized value indicates the actually measured average destruction value. The result of general evaluation of these measurement results is indicated by mark "O" (good) or "X" (bad) in the column of Evaluation in each Table.

TABLE 1

| Glass | ZnO | $B_2O_3$ | $SiO_2$ | $Al_2O_3$ | $Na_2O$ | $Li_2O$ | $Bi_2O_3$ | PbO |
|---|---|---|---|---|---|---|---|---|
| A* | 38.0 | 30.0 | 27.5 | 1.0 | 1.5 | 2.0 | — | — |
| B | 40.0 | 30.0 | 25.5 | 1.0 | 1.5 | 2.0 | — | — |
| C | 50.0 | 25.0 | 20.5 | 1.0 | 1.5 | 2.0 | — | — |
| D | 65.0 | 20.0 | 10.5 | 1.0 | 1.5 | 2.0 | — | — |
| E* | 67.0 | 20.0 | 10.5 | 1.0 | 1.5 | — | — | — |
| F* | 52.5 | 18 | 25 | 1.0 | 1.5 | 2.0 | — | — |
| G | 50.5 | 20 | 25 | 1.0 | 1.5 | 2.0 | — | — |
| H | 45.5 | 30 | 20 | 1.0 | 1.5 | 2.0 | — | — |
| I | 43.5 | 40 | 12 | 1.0 | 1.5 | 2.0 | — | — |
| J* | 41.5 | 42 | 12 | 1.0 | 1.5 | 2.0 | — | — |
| K* | 52.5 | 35 | 8 | 1.0 | 1.5 | 2.0 | — | — |
| L | 50.5 | 35 | 10 | 1.0 | 1.5 | 2.0 | — | — |
| M | 40.5 | 35 | 20 | 1.0 | 1.5 | 2.0 | — | — |
| N | 40.5 | 20 | 35 | 1.0 | 1.5 | 2.0 | — | — |
| O* | 40.5 | 20 | 37 | 1.0 | 1.5 | — | — | — |
| P* | — | 25 | 20 | 1.0 | 1.5 | 2.0 | 50.5 | — |
| Q* | — | 25 | 20 | 1.0 | 1.5 | 2.0 | — | 50.5 |

Note *outside the scope of the present invention

TABLE 2

| Sample No. | Formation of External Electrode | | Electrical Characteristics of Capacitor | | | | |
|---|---|---|---|---|---|---|---|
| | Metal-glass in Paste | Sintering (30 min) | Electric capacity (nF) | Dielectric loss tan δ (%) | Insulation resistance IR (MΩ) | Withstand voltage | Temperature characteristic |
| 1 | Ni-A* | 900° C., $N_2$ atmosphere | 182.5 | 2.89 | $2.5 \times 10^5$ | OK | Y5V |
| 2 | Ni-B | 900° C., $N_2$ atmosphere | 185.7 | 2.84 | $2.5 \times 10^5$ | OK | Y5V |
| 3 | Ni-C | 900° C., $N_2$ atmosphere | 187.6 | 2.77 | $2.5 \times 10^5$ | OK | Y5V |
| 4 | Ni-D | 900° C., $N_2$ atmosphere | 183.1 | 2.63 | $2.5 \times 10^5$ | OK | Y5V |
| 5 | Ni-E* | 900° C., $N_2$ atmosphere | 187.9 | 2.71 | $2.5 \times 10^5$ | OK | Y5V |
| 6 | Ni-F* | 900° C., $N_2$ atmosphere | 184.2 | 2.68 | $2.5 \times 10^5$ | OK | Y5V |
| 7 | Ni-G | 900° C., $N_2$ atmosphere | 186.5 | 2.90 | $2.5 \times 10^5$ | OK | Y5V |
| 8 | Ni-H | 900° C., $N_2$ atmosphere | 188.8 | 2.81 | $2.5 \times 10^5$ | OK | Y5V |
| 9 | Ni-I | 900° C., $N_2$ atmosphere | 184.1 | 2.75 | $2.5 \times 10^5$ | OK | Y5V |
| 10 | Ni-J* | 900° C., $N_2$ atmosphere | 186.0 | 2.69 | $2.5 \times 10^5$ | OK | Y5V |
| 11 | Ni-K* | 900° C., $N_2$ atmosphere | 185.3 | 2.70 | $2.5 \times 10^5$ | OK | Y5V |
| 12 | Ni-L | 900° C., $N_2$ atmosphere | 186.1 | 2.85 | $2.5 \times 10^5$ | OK | Y5V |
| 13 | Ni-M | 900° C., $N_2$ atmosphere | 188.4 | 2.63 | $2.5 \times 10^5$ | OK | Y5V |
| 14 | Ni-N | 900° C., $N_2$ atmosphere | 187.9 | 2.74 | $2.5 \times 10^5$ | OK | Y5V |
| 15 | Ni-O* | 900° C., $N_2$ atmosphere | 186.6 | 2.99 | $2.5 \times 10^5$ | OK | Y5V |
| 16 | Ni-P* | 900° C., $N_2$ atmosphere | 86.1 | 7.33 | $2.5 \times 10^5$ | OK | Y5V |
| 17 | Ni-Q* | 900° C., $N_2$ atmosphere | 42.8 | 9.50 | $2.5 \times 10^5$ | OK | Y5V |

TABLE 2-continued

|  |  | Characteristics of External Electrode | | | | | |
|---|---|---|---|---|---|---|---|
|  |  | Solder Leach Resistance (270° C.) | | | | Adhesive Strength | |
| Sample No. | Soldering 230° C., 3 seconds | 3 sec. | 20 sec. | 1 min | 10 min | of External Electrode (kg) | Evaluation |
| 1 | O | O | x | x | x | x (0.51) | x |
| 2 | O | O | O | O | O | O (2.70) | O |
| 3 | O | O | O | O | O | O (2.96) | O |
| 4 | O | O | O | O | O | O (2.56) | O |
| 5 | O | O | x | x | x | x (0.70) | x |
| 6 | O | O | x | x | x | x (0.62) | x |
| 7 | O | O | O | O | O | O (2.43) | O |
| 8 | O | O | O | O | O | O (2.68) | O |
| 9 | O | O | O | O | O | O (2.49) | O |
| 10 | O | O | x | x | x | x (0.81) | x |
| 11 | O | O | x | x | x | x (0.54) | x |
| 12 | O | O | O | O | O | O (2.55) | O |
| 13 | O | O | O | O | O | O (2.81) | O |
| 14 | O | O | O | O | O | O (2.06) | O |
| 15 | O | O | x | x | x | x (0.84) | x |
| 16 | x | x | x | x | x | x (0.25) | x |
| 17 | x | x | x | x | x | x (0.30) | x |

Note
*outside the scope of the invention

TABLE 3

|  | Formation of External Electrode | | Electric Characteristics of Capacitor | | | | |
|---|---|---|---|---|---|---|---|
| Sample No. | Metal-glass in paste | Sintering (30 min) | Electric capacity (nF) | Dielectric loss tan δ (%) | Insulation resistance IR (MΩ) | Withstand voltage | Temperature characteristic |
| 18 | Cu-A* | 900° C., $N_2$ atmosphere | 190.2 | 2.92 | $2.5 \times 10^5$ | OK | Y5V |
| 19 | Cu-B | 900° C., $N_2$ atmosphere | 188.0 | 2.85 | $2.5 \times 10^5$ | OK | Y5V |
| 20 | Cu-C | 900° C., $N_2$ atmosphere | 186.5 | 2.86 | $2.5 \times 10^5$ | OK | Y5V |
| 21 | Cu-D | 900° C., $N_2$ atmosphere | 188.3 | 2.71 | $2.5 \times 10^5$ | OK | Y5V |
| 22 | Cu-E* | 900° C., $N_2$ atmosphere | 187.5 | 2.84 | $2.5 \times 10^5$ | OK | Y5V |
| 23 | Cu-F* | 900° C., $N_2$ atmosphere | 187.2 | 2.83 | $2.5 \times 10^5$ | OK | Y5V |
| 24 | Cu-G | 900° C., $N_2$ atmosphere | 189.1 | 2.79 | $2.5 \times 10^5$ | OK | Y5V |
| 25 | Cu-H | 900° C., $N_2$ atmosphere | 186.6 | 2.85 | $2.5 \times 10^5$ | OK | Y5V |
| 26 | Cu-I | 900° C., $N_2$ atmosphere | 188.4 | 2.66 | $2.5 \times 10^5$ | OK | Y5V |
| 27 | Cu-J* | 900° C., $N_2$ atmosphere | 186.7 | 2.80 | $2.5 \times 10^5$ | OK | Y5V |
| 28 | Cu-K* | 900° C., $N_2$ atmosphere | 185.3 | 2.90 | $2.5 \times 10^5$ | OK | Y5V |
| 29 | Cu-L | 900° C., $N_2$ atmosphere | 187.7 | 2.83 | $2.5 \times 10^5$ | OK | Y5V |
| 30 | Cu-M | 900° C., $N_2$ atmosphere | 188.0 | 2.74 | $2.5 \times 10^5$ | OK | Y5V |
| 31 | Cu-N | 900° C., $N_2$ atmosphere | 189.5 | 2.80 | $2.5 \times 10^5$ | OK | Y5V |
| 32 | Cu-O* | 900° C., $N_2$ atmosphere | 188.6 | 2.88 | $2.5 \times 10^5$ | OK | Y5V |
| 33 | Cu-P* | 900° C., $N_2$ atmosphere | 26.3 | 5.26 | $2.5 \times 10^5$ | OK | Y5V |
| 34 | Cu-Q* | 900° C., $N_2$ atmosphere | 46.1 | 7.22 | $2.5 \times 10^5$ | OK | Y5V |

|  |  | Characteristics of External Electrode | | | | | |
|---|---|---|---|---|---|---|---|
|  |  | Solder Leach Resistance (270° C.) | | | | Adhesive Strength | |
| Sample No. | Soldering 230° C., 3 seconds | 3 sec. | 20 sec. | 1 min. | 10 min. | of External Electrode (kg) | Evaluation |
| 18 | O | O | x | x | x | x (0.60) | x |
| 19 | O | O | O | O | O | O (2.80) | O |
| 20 | O | O | O | O | O | O (2.81) | O |
| 21 | O | O | O | O | O | O (2.55) | O |
| 22 | O | O | x | x | x | x (0.78) | x |
| 23 | O | O | x | x | x | x (0.71) | x |
| 24 | O | O | O | O | O | O (2.89) | O |
| 25 | O | O | O | O | O | O (2.74) | O |
| 26 | O | O | O | O | O | O (2.66) | O |
| 27 | O | O | x | x | x | x (0.82) | x |
| 28 | O | O | x | x | x | x (0.73) | x |
| 29 | O | O | O | O | O | O (2.21) | O |
| 30 | O | O | O | O | O | O (2.86) | O |
| 31 | O | O | O | O | O | O (2.46) | O |
| 32 | O | O | x | x | x | x (0.65) | x |
| 33 | x | x | x | x | x | x (0.25) | x |
| 34 | x | x | x | x | x | x (0.33) | x |

Note
*outside the scope of the invention

Samples 2, 3, 4, 7, 8, 9, 12, 13, 14, 19, 20, 21, 24, 25, 26, 29, 30 and 31 are within the scope of the present invention. In each of these samples, the metal for the termination electrode is nickel (Ni) which is the same as the metal of the internal electrode or copper capable of being easily alloyed with nickel (Ni), and the glass component to be mixed with this metal is the glass B, C, D, G, H, I, L, M or N within the scope of the present invention, shown in Table 1. In these samples, the electric capacity is at least 183.1 nF and the dielectric loss is not larger than 2.90%, and the electric characteristics of the capacitor are not degraded. Furthermore, in these samples, the adhesive strength of the termination electrode is at least 2.06 Kg and is excellent. In contrast, in each of samples 1, 5, 6, 10, 11, 15, 18, 22, 23, 27, 28 and 32, although the metal for the termination electrode is nickel (Ni) which is the same as the metal of the internal electrode or copper (Cu) capable of being easily alloyed with nickel (Ni), the glass component is the glass A, E, F, J, K or O outside the scope of the present invention, shown in Table 1. In these sample, the electric capacity and dielectric loss (tan δ) are comparable to those of the samples within the scope of the present invention, but the adhesive strength of the termination electrode is 0.84 Kg or less and is drastically degraded. In each of samples 16, 17, 33 and 34, although the metal for the termination is nickel (Ni) which is the same as the metal of the internal electrode or copper (Cu) capable of being easily alloyed with nickel (Ni), the glass P or Q, shown in Table 1, containing bismuth oxide ($Bi_2O_3$) or lead oxide (PbO) is used as the glass component to be mixed with the metal. The electrostatic capacity is 86.1 nF or less and the dielectric loss (tan δ) is 5.26% or larger, and the electric characteristics of the capacitor are drastically degraded. Moreover, the adhesive strength of the termination electrode is 0.33 Kg or lower. Accordingly, these samples cannot be practically used.

Furthermore, samples 1 through 34 described above were subjected to the soldering test and the solder leach resistance test. In each of samples 2, 3, 4, 7, 8, 9, 12, 13, 14, 19, 21, 24, 25, 26, 29, 30 and 31, the wettability with the solder, that is, at least 75% of the surface of the electrode was covered with the solder was very good, and any defect of the appearance or of the electric characteristics (reduction of the electric characteristics by solder leaching) was not observed. In contrast, in case of samples 1, 5, 6, 10, 11, 15, 18, 22, 23, 28 and 32, the wettability with the solder was good, that is, at least 75% of the surface of the external electrode was covered with the solder. However, when sample was immersed for more than 20 seconds, the appearance was degraded and the electric characteristics were degraded (by solder leaching), and it was found that these samples cannot be put into practical use. In samples 16, 17, 33 and 34, the wettability with the solder was bad and a defect was found in the appearance and the electric characteristics.

EXAMPLE 2

Small amounts of aluminum hydroxide ($Al(OH)_3$), sodium carbonate ($Na_2CO_3$) and lithium carbonate ($Li_2CO_3$) were added to zinc oxide (ZnO), boric acid ($H_3BO_3$) and silicic anhydride ($SiO_2$) to form a glass composition comprising 50 mole% of zinc oxide (ZnO), 30 mole% of boric acid ($B_2O_3$), 1 mole% of alumina ($Al_2O_3$), 15 mole% of silica ($SiO_2$), 2 mole% of sodium oxide ($Na_2O$) and 2 mole% of lithium oxide ($Li_2$). The composition was dry-blended in an automatic mortar and melted at 1200° C. in a platinum crucible, and the melt was cast on a stainless steel plate and rapidly cooled in air to obtain a glass block. The obtained glass block was pulverized and passed through a 250-mesh sieve to obtain a glass powder.

A metal powder comprising nickel, cobalt and copper powders having a chemical purity of 99.5% and an average particle size of 1.0 μm at a mixing ratio shown in Table 4 was mixed with an organic vehicle and the glass powder so that the metal/vehicle/glass weight ratio was 69/25/6. The composition was mixed by a three-roll mill to form a paste. Some organic solvent was added to the paste to adjust the viscosity of the paste. The mixing ratio of nickel (Ni), cobalt (Co) and copper (Cu) in the paste was such that the amount of these metals was about 80% by volume per about 20% by volume of the glass.

The paste was coated on the end portion of a multilayer ceramic capacitor comprising internal electrodes of nickel, and the paste was dried and sintered at 900° C. for 30 minutes in a nitrogen atmosphere to fire and fix the termination electrodes to the capacitor. Thus, samples 1 through 15 shown in Table 4 were obtained. The used multilayer ceramic capacitor was formed from a barium titanate type dielectric material and nickel as the internal electrode material. The size of the capacitor was about 3.18 mm × about 1.57 mm × about 0.56 mm. The width of the paste coated on the end portion of the capacitor was about 0.5 mm, and the amount coated was about 1.5 mg on both the sides.

With respect to each of the so-obtained samples, the electric capacity and dielectric loss (tan δ) were measured at 25° C. at a frequency of 1 KHz and an input voltage of 1 Vrms. Furthermore, the insulation resistance (IR) was measured after a direct current voltage of 50 V was applied for 1 minute, and the withstand voltage was tested by applying a direct current voltage of 125 V for 3 seconds. Moreover, the temperature characteristic of the electric capacity was determined within a temperature range of from −30° C. to +85° C. at a frequency of 1 KHz and an input voltage of 1 Vrms.

The results of the measurements of the electric characteristics of the capacitor are shown in Table 5. Furthermore, the results of the evaluation of the characteristics of the termination electrodes described below, are shown in Table 6.

In order to evaluate the wettability of a solder with the termination electrodes, the sample was immersed in a molten solder at 230° C. for 3 seconds. The case where at least 75% of the surface of the termination electrodes was covered with the solder is indicated by mark "O", and the case where less than 75% of the surface of the termination electrodes was covered with the solder is indicated by mark "X". Still further, in order to make the solder leach resistance test of the termination electrodes, the sample was immersed in the molten solder at 270° C. for 1 minute. The case where there was no defect on the appearance or in connection with the electric characteristics is indicated by mark "O", and the case where a defect appeared was indicated by mark "X". Still further, the adhesive strength of the termination electrodes was tested (the sample was soldered to a copper-lined glass/epoxy substrate, the sample was pushed from the back side of the substrate through the hole that arranged under the sample and the strength of the force causing destruction of the sample was measured).

TABLE 4

| Sample No. | Nickel | Cobalt | Copper |
| --- | --- | --- | --- |
| 1 | 95 | — | 5 |
| 2 | 90 | — | 10 |
| 3 | 50 | — | 50 |
| 4 | 10 | — | 90 |
| 5 | 5 | — | 95 |
| 6 | — | 95 | 5 |

TABLE 4-continued

| Sample No. | Nickel | Cobalt | Copper |
|---|---|---|---|
| 7 | — | 90 | 10 |
| 8 | — | 50 | 50 |
| 9 | — | 10 | 90 |
| 10 | — | 5 | 95 |
| 11 | 47.5 | 47.5 | 5 |
| 12 | 45 | 45 | 10 |
| 13 | 25 | 25 | 50 |
| 14 | 5 | 5 | 90 |
| 15 | 2.5 | 2.5 | 95 |

TABLE 5

| Sample No. | Electric capacity (nF) | Dielectric loss tan δ (%) | Insulation resistance IR (MΩ) | Temperature characteristic |
|---|---|---|---|---|
| 1 | 332.8 | 2.88 | $1.0 \times 10^5$ | Y5V |
| 2 | 338.2 | 2.76 | $1.0 \times 10^5$ | Y5V |
| 3 | 334.5 | 2.81 | $1.0 \times 10^5$ | Y5V |
| 4 | 336.4 | 2.80 | $1.0 \times 10^5$ | Y5V |
| 5 | 328.9 | 2.60 | $1.0 \times 10^5$ | Y5V |
| 6 | 330.5 | 2.86 | $1.0 \times 10^5$ | Y5V |
| 7 | 334.0 | 2.70 | $1.0 \times 10^5$ | Y5V |
| 8 | 329.5 | 2.84 | $1.0 \times 10^5$ | Y5V |
| 9 | 334.4 | 2.73 | $1.0 \times 10^5$ | Y5V |
| 10 | 330.1 | 2.74 | $1.0 \times 10^5$ | Y5V |
| 11 | 331.8 | 2.77 | $1.0 \times 10^5$ | Y5V |
| 12 | 332.9 | 2.83 | $1.0 \times 10^5$ | Y5V |
| 13 | 331.7 | 2.74 | $1.0 \times 10^5$ | Y5V |
| 14 | 332.3 | 2.69 | $1.0 \times 10^5$ | Y5V |
| 15 | 330.6 | 2.81 | $1.0 \times 10^5$ | Y5V |

TABLE 6

| Sample No. | Soldering 230° C., 3 seconds | Solder leach resistance 270° C., 1 minute | Adhesive strength of external electrode (kg) |
|---|---|---|---|
| 1 | O | O | 3.14 |
| 2 | O | O | 3.56 |
| 3 | O | O | 3.89 |
| 4 | O | O | 3.70 |
| 5 | O | O | 3.61 |
| 6 | O | O | 3.55 |
| 7 | O | O | 3.67 |
| 8 | O | O | 3.82 |
| 9 | O | O | 3.77 |
| 10 | O | O | 3.64 |
| 11 | O | O | 3.21 |
| 12 | O | O | 3.44 |
| 13 | O | O | 3.43 |
| 14 | O | O | 3.58 |
| 15 | O | O | 3.75 |

Each of the samples shown in Tables 4 through 6 is within the scope of the present invention, and the metal for the termination electrodes is nickel (Ni) which is the same as the metal of the internal electrode or cobalt (Co) or copper (Cu) capable of being easily alloyed with nickel (Ni). In each of the these samples, the electrostatic capacity is 328.9 nF or larger and the dielectric loss (tan δ) is 2.8% or smaller, and the electric characteristics of the capacitor are not degraded. Furthermore, the adhesive strength of the termination electrodes is 3.14 Kg or higher and is very excellent.

Furthermore, in these samples, any defect was not caused with respect to the appearance or the electric characteristics at the soldering test or the solder leach resistance test.

Comparing the adhesive strength of the termination electrodes in the case of Table 2 or 3 and the case of Table 6, it is understood that it is better to use both nickel and copper than to use only one metal element either nickel or copper for the metal component of the termination electrodes. This is for the following reasons.

If a composition comprising only Ni and the glass component is used for the termination electrodes, since Ni has a magnetic property, metal particles attract one another and they densely aggregate, and the glass component is placed in the state separated from the metal. Accordingly, the contact between the metal and the glass is not sufficient, so the adhesive strength of the termination electrodes is somewhat low. On the other hand, if a composition comprising only Cu and the glass component is used for the termination electrodes, since copper metal is not wettable with the glass melt so well in the nitrogen atmosphere, as a result, the contact between the metal and the glass is not sufficient likewise the case of Ni, so the adhesive strength of the termination electrodes is somewhat low.

On the contrary, if a composition comprising Ni and Cu and the glass component is used for the termination electrodes, such aggregation is decreased. This is for the following reasons. Since Cu has not a magnetic property and Cu is easily alloyed with Ni enough below the melting points, dispersion of Ni into the glass component is promoted by Cu. Furthermore, since Ni is wettable with the glass melt well in the nitrogen atmosphere because Ni is somewhat oxidizable in the nitrogen atmosphere, dispersion of Cu into the glass component is promoted by Ni.

So, when the termination electrodes is comprised of Ni and Cu and the glass component the adhesive strength of the termination electrodes is higher than the case that only Ni or Cu is used for the metal component of the termination electrodes.

We claim:

1. A multilayer ceramic capacitor comprising a laminate of units, each comprising a ceramic dielectric layer and an internal electrode, and termination electrodes arranged around said laminate and electrically connected to the internal electrodes, wherein the internal electrodes are composed of nickel and the termination electrodes are composed of a composition comprising (i) a metal component and (ii) a glass component of zinc borosilicate glass, said metal component consisting essentially of;

(a) at least one member selected from the group consisting of nickel and cobalt; and
    (b) copper, the weight ratio of (a) the at least one member selected from the group consisting of nickel and cobalt to (b) copper being from 95/5 to 5/95 and the volume ratio of (i) the metal component to (ii) the glass component being from 70/30 to 95.0/5.0.

2. A multilayer ceramic capacitor as set forth in claim 1, wherein the zinc borosilicate glass of the composition for formation of the termination electrodes comprises at least 40 to 50 mole%, based on the oxides, of zinc oxide, 20 to 40 mole%, based on the oxides, of boric anhydride and 10 to 35 mole%, based on the oxides, of silica.

3. A multilayer ceramic capacitor as set forth in claim 1, wherein the content of the metal component is between 75 to 85% by volume of the termination electrode.

4. A multilayer ceramic capacitor as set forth in claim 1, wherein the at least one member selected from the group consisting of nickel and cobalt has an average particle size of 0.5 to 1.4 um.

* * * * *